J. S. WENTWORTH.
PROCESS AND MACHINE FOR SOIL TILLAGE.
APPLICATION FILED OCT. 8, 1915.

1,276,843.

Patented Aug. 27, 1918.
3 SHEETS—SHEET 1.

Inventor
Jesse S. Wentworth
La Porte, Bean & Graham
Attys

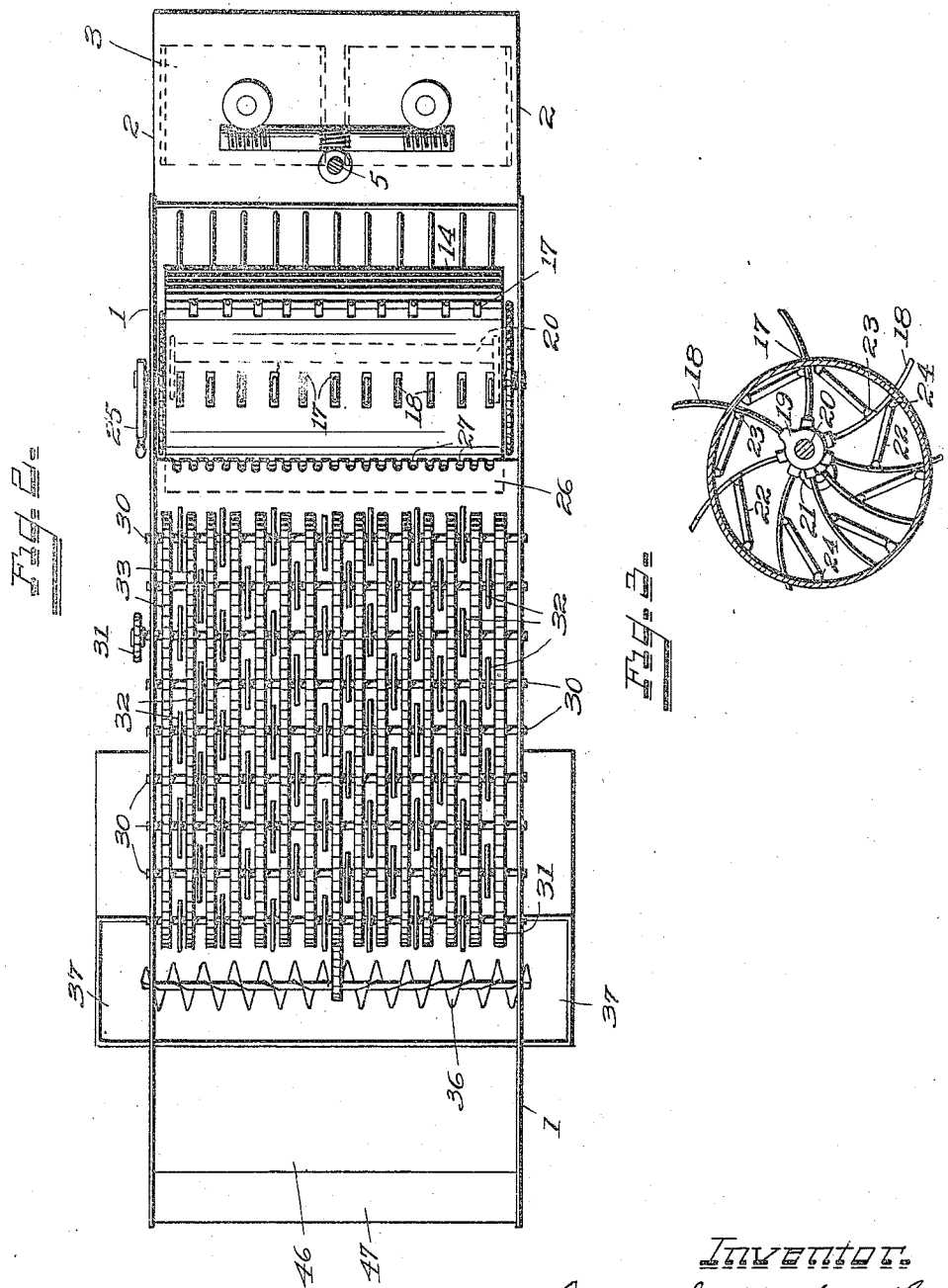

J. S. WENTWORTH.
PROCESS AND MACHINE FOR SOIL TILLAGE.
APPLICATION FILED OCT. 8, 1915.
1,276,843.
Patented Aug. 27, 1918.
3 SHEETS—SHEET 3.
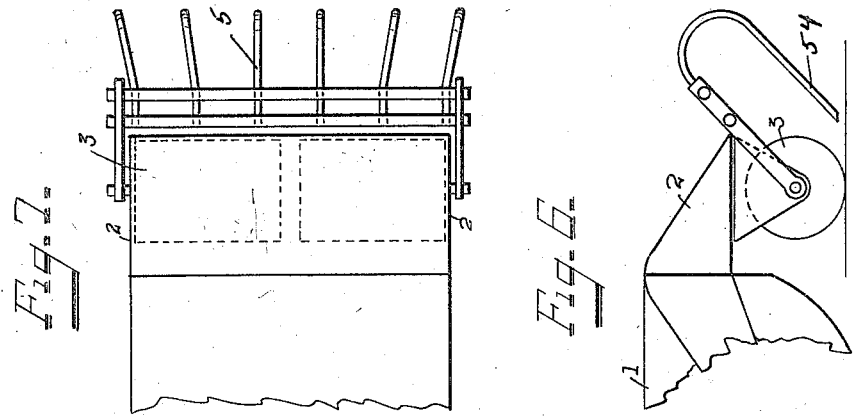
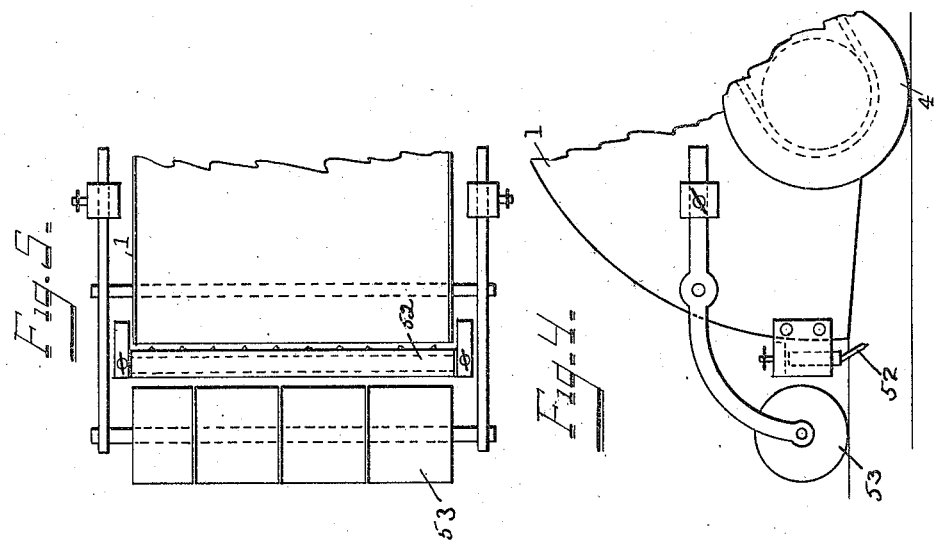
WITNESSES:
INVENTOR.
Jesse S. Wentworth.
BY La Porte, Beau & Graham
ATTORNEY

UNITED STATES PATENT OFFICE.

JESSE S. WENTWORTH, OF DECATUR, ILLINOIS.

PROCESS AND MACHINE FOR SOIL-TILLAGE.

1,276,843.     Specification of Letters Patent.     Patented Aug. 27, 1918.

Application filed October 8, 1915. Serial No. 54,824.

*To all whom it may concern:*

Be it known that I, JESSE S. WENTWORTH, a resident of Decatur, county of Macon, and State of Illinois, have invented certain new and useful Improvements in Processes and Machines for Soil-Tillage, of which the following is a specification.

My invention relates to improvements in method or process of soil tillage.

The principal object of this invention is the provision of a new method or process of soil tillage which consists in removing a layer of soil, vegetation and other material from the ground, disintegrating this material and separating the finer particles therefrom, depositing the larger particles of soil, vegetation and other material in the trench or ditch formed by the removal of said material and then depositing the finer particles of material on top to form a loose mulch.

Another object of this invention is the provision of a new method or process of soil tillage which consists in removing a layer of soil, vegetation and other material from the ground, disintegrating the material, removing a portion of the soil from the bottom of the ditch or trench, separating the finer particles of soil therefrom, discharging the vegetation and larger particles of material on the bottom of the ditch or trench made by the removal of the layer of material, compressing the same, separating the finer particles into grades of varying fineness and discharging them into said trench or ditch with the finest on top, leaving the top portion of the soil in the form of a loose mulch, various steps of the method taking place while the material is carried and held in suspension, so as to thoroughly aerate the soil and other material.

To the accomplishment of the foregoing and such other objects as may hereinafter appear, my invention consists in the method or process defined in the claims reference being had to the accompanying drawings forming a part hereof and which show merely for the purpose of illustrative disclosure, a preferred embodiment of means for carrying said method or process into effect, it being understood that various changes in the method or process may be made in practice within the scope of the claims without digressing from my inventive idea.

In the drawings:—

Fig. 2 is a combined horizontal section and plan view showing the various operating parts.

Fig. 3 is a detail view of the digging cylinder.

Fig. 4 represents a side elevation of the rear portion of the machine with an auxiliary roller and raking device mounted thereon.

Fig. 5 represents a top plan view of the parts shown in Fig. 4.

Fig. 6 represents a side elevation of the forward portion of the machine with a raking device or attachment mounted in front thereof.

Fig. 7 represents a top plan view of the parts shown in Fig. 6.

Figure 1:
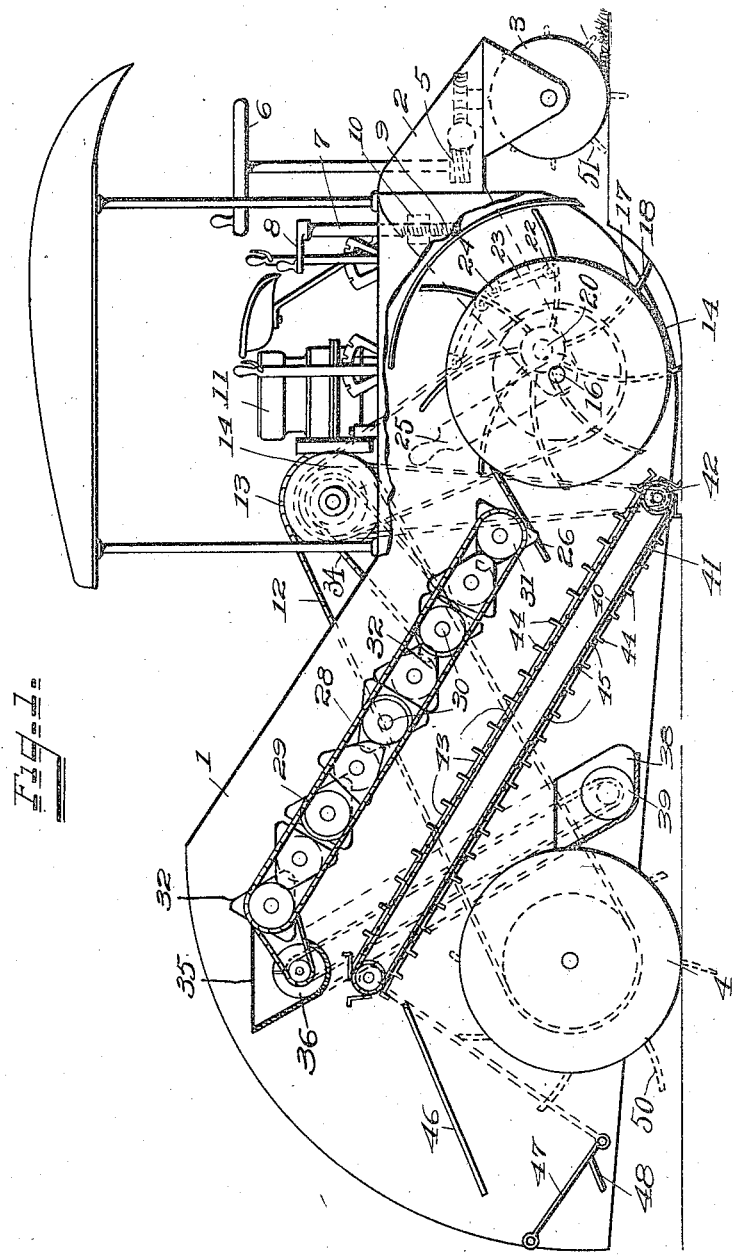
Figure 1 is a vertical longitudinal section through an embodiment of my invention adapted to carry out my new and improved method of soil tillage.

The present method of soil tillage or cultivation preparatory to planting is long, tedious and expensive, involving a number of operations by different machines. Furthermore, it is usually necessary to clear the ground to at least some extent, the plowing operation leaves a compacted portion of soil and it is usually impossible to effectively prepare the soil for planting when it is frozen. With these and numerous other disadvantages in mind I evolved the method disclosed herein and also the machine whereby the soil is completely treated in one continuous operation, the vegetation covered so as to gain maximum fertilization therefrom and the soil disintegrated and deposited in the form of a loose mulch.

My new method or process as carried out by the disclosure in this application includes first, the removal of a certain amount or layer of the top portion of the soil including the vegetation and other material by means of a roller having the tines or spikes thereon which forms a sort of trench or ditch. This layer of soil and vegetation is presented to a sieve and conveyer which pounds or breaks the larger particles and through which the finer particles of soil drop, the larger particles of soil and vegetation remaining being carried upwardly by the conveyer and delivered to a chute or other discharge medium which eventually discharges the vegetation and larger portions of the soil on the bottom of the trench or ditch, in front of a roller which compresses the same. The smaller particles of material fall through the sieve onto a conveyer which is part of an auxiliary mechanism which digs or removes a portion of the soil or earth from the bottom of the trench or ditch previously formed. All of this soil or earth is carried by the last mentioned conveyer to a screening or separating mechanism whereby it is delivered in grades of various degrees of fineness to the trench or ditch behind the previous described roller, the finer particles being placed on top in the form of a loose mulch, leaving the soil in condition for planting. This may be raked and compressed to some extent after the finer particles are deposited to fix the top layer.

Referring now to the drawings, wherein I show a preferred form of mechanism for effectively carrying out this process, the numeral 1 designates the main frame of the machine which is formed so as to support and house the various parts. To the front portion of this main frame is pivotally connected the front or auxiliary frame 2, which is supported by the front guiding rollers 3, the main frame being supported and driven by the traction roller 4. I provide the worm gear arrangement 5 operated by the handle member 6 for controlling the rollers 3 so as to steer the machine as desired. I also provide the shaft 7 operated by handle 8 having the screw threads 9 working in the stationary nut 10 for the purpose of adjusting the angular relation between the main frame and the front or auxiliary frame, this being for the purpose of regulating the depth to which the digging and cutting cylinder operates in the top portion of the soil.

I also provide on the main frame a suitable motor 11 from which the various parts are driven. The traction roller 4 is driven by operating connection 12 from the gears 13 which are controlled suitably so as to vary the speed and direction of movement of the machine as is well understood. Any suitable means for this purpose may be used.

In the front portion of the machine, I provide the cylinder or roller 14 which is driven by means of operating connection 15 from the motor in a direction opposite to the direction of movement of the mechanism as a whole. This cylinder is mounted on the stationary stud shafts 16 and has its outer surface provided with the plurality of apertures or slots 17 through which are projected suitable tines or digging and cutting members 18, preferably of the form substantially as shown in the drawings. These digging and cutting members 18 are provided with the apertured ear portions 19 which are secured to the stationary shaft 20, this shaft being connected to the stud shafts 16 by means of members 21. These cutting and digging members are pivotally mounted within the cylinder by means of links 22 which are pivoted to the members 18 at 23 and to the inside of a cylinder as at 24. It is seen that the shaft 20 to which these digging and cutting members are loosely connected has an eccentric relation with the stud shafts 16 and consequently with the cylinder as a whole, and this eccentric relation may be varied by means of an adjusting lever 25 connected to the stud shafts 16. Therefore due to this eccentric positioning of shaft 20 and links 23, when the cylinder is rotated, the digging and cutting members 18 will be forced outwardly beyond said aperture 17 in the cylinder and then withdrawn, this reciprocation taking place during one rotation of the cylinder. Obviously the projection of these digging and cutting members takes place along or adjacent the bottom line of the trench, so that all of the soil and vegetation thereabove will be dug and lifted by means of said members over the top of the cylinder and deposited on a combined sieve and conveyer which will presently be described. Of course it is understood that the frame and housing is so shaped about these members as to permit their proper operation and also to assist in the retention of the soil and vegetation or other material on the cylinder and cutting and digging members until it is discharged onto the sieve and conveyer member or removed by means of the apron 26. This apron has slots 27 in its upper edge to permit the passage of the digging and cutting members 18 and also slots 28 in its lower edge to permit its proper cooperation with the sieve and conveyer member. It is also to be understood that the retraction of the digging and cutting members within the cylinder acts to automatically strip any soil or other material which may adhere thereto so that the cylinder is cleaned automatically and all of the material discharged onto the sieve and conveyer member.

This sieve and conveyer member is designated generally by the reference character 29, and, as shown, is located to the rear of the cylinder 14, extending rearwardly and upwardly to certain discharge chutes and conveyers which will be described hereinafter. This combined sieve and conveyer comprises the plurality of transversely extending shafts 30 on which shafts are mounted, preferably in alternation, sprocket wheels 31 and disk members 32, the sprocket wheels and disk members on alternate shafts being arranged in staggered relation. Suitable chains 33 are connected to said sprocket members, these parts all being driven from the motor by means of a chain and sprocket connection 34. As shown, the disks are preferably triangular in shape, having their ends slightly curved or rounded. The function of this part of the mechanism is to separate the larger particles of vegetation and soil from the smaller particles, as well as to disintegrate the particles of material to some extent, due to the pounding action of the disks and chains. The smaller particles pass through this member while the larger particles including the vegetation, are conveyed upwardly to the discharge chutes and conveyers.

These include the horizontally extending troughs 35 having the screw conveyers 36 therein. These troughs extend to the edge of the machine and communicate with the downwardly extending chutes 37, which in turn communicate with the horizontally extending troughs 38 in which is positioned another screw conveyer 39. These last mentioned troughs have a discharge opening positioned immediately in front of the roller 4 so that the larger particles of soil, vegetation and other material which do not pass through the sieve member 29 are placed at the bottom of the ditch or trench formed by the cylinder 14 and are compressed by the action of the roller 4.

In connection with these elements of my construction I also provide an auxiliary digging and conveying member 40 which is positioned to the rear of the cylinder 14 and beneath the combined sieve and conveyer member 29, being somewhat longer than said member and serving to remove a portion of the soil in the bottom of the ditch or trench made by the digging and cutting cylinder 14 and to convey said soil together with the soil and other material which has passed through the sieve and conveyer member 29 up to a suitable screening mechanism for further separation. This digging and conveying mechanism includes the endless chains or belts 41 driven by means of sprockets 42 and having mounted thereon the series of digging and conveying buckets or receptacles 43, these being merely members with flat bottoms and having the outwardly extending end flange 44 for the purpose of digging and retaining material discharged thereon. These buckets or receptacles are pivotally connected to said endless chains 41 at a point about two-fifths of the distance from their unflanged ends, as at 45, so that as they pass around the lower sprocket they will be thrown outwardly to dig into and remove a portion of the soil in the bottom of the previously formed ditch or trench and will lift and convey said soil upwardly together with the material which has passed through the sieve as above described until it reaches the upper turn when due to the pivotal connection with the chains, said buckets or receptacles will be thrown outwardly, discharging the material therein onto the chute 46 from whence it passes by gravity to the vibrating screen 47. This screen is driven by any suitable means and serves to separate the finer particles of soil and other material, the larger particles being passed off the screen and deposited in a ditch or trench in the rear of the roller 4, the finer particles being deposited on top thereof, the guard 48 insuring the proper discharge of this material. It is to be understood that while I have shown only one vibrating screen, that a number may be used if desired, the purpose being to deposit the soil and other material in varying degrees of fineness into the trench which has been made by the cutting and digging cylinder and the digging conveyer, so that the top portion of the treated soil is in proper condition for immediate planting after it has been subjected to the action of this machine.

Attention is directed to the fact that I also contemplate the use of digging and cutting members 50 similar to those shown in cylinder 14, in connection with the roller 4, as indicated in dotted lines, this being for the purpose of intermixing and tamping the vegetation and other material, and also to give proper traction to the roller 4 in driving the machine. These members 50 are operated in substantially the same way as members 18. This same provision may be made in connection with rollers 3 as indicated in dotted lines at 51.

After the fine particles of material have been deposited, I may rake and compress the soil, as shown in Figs. 4 and 5 of the drawing wherein, 52 designates the rake and 53 the roller mounted to travel in the rear thereof.

As it may be advisable under certain conditions to rake the vegetation and other material into proper position for effective operation of the cutting and digging members, I may use a raking device in front of the machine, as shown in Figs. 6 and 7 of the drawing, wherein 54 designates the rake.

The various driving connections shown are merely illustrative, it being understood that various well known forms of gearing may be used.

It is to be expressly understood that while I have disclosed a preferred embodiment of a machine for carrying out my method or process, that I am not to be limited thereto, but that the invention may be practised by various other means.

What I claim is:—

1. The method of tilling the soil consisting in removing a layer of the soil, vegetation and other material, disintegrating the same and separating the finer particles therefrom, removing a portion of the soil from the bottom of the ditch or trench formed by the removal of the layer of material, depositing the larger particles of soil, vegetation and other material in the bottom of said ditch or trench, separating said finer particles and the second portion of soil removed, into grades of varying fineness and depositing said grades of material in said ditch or trench, with the finest grade on top in the form of a loose mulch.

2. A method of tilling the soil, consisting in removing a layer of the soil, vegetation and other material, disintegrating the same and separating the finer particles therefrom and removing a portion of the soil from the bottom of the ditch or trench formed by the removal of the layer of material, these steps of the method taking place while the soil, vegetation and other material is held in suspension so as to aerate the same, depositing the larger particles of soil, vegetation or other material in the bottom of the ditch or trench, separating said finer particles and the second mentioned portion of soil removed, into grades of varying fineness and depositing the said grades of material in the ditch or trench with the finest grade on top in the form of a loose mulch.

3. A method of tilling the soil, consisting in removing a layer of the soil, vegetation and other material, disintegrating the same and separating the finer particles therefrom, removing a portion of the soil from the bottom of the ditch or trench formed by the removal of the layer of material, these steps of the method taking place while the soil, vegetation and other material is held in suspension so as to aerate the same, depositing the larger particles of soil, vegetation and other material in the bottom of the ditch or trench, compressing said redeposited layer of soil, vegetation and other material, separating said finer particles and the second mentioned portion of soil removed into grades of varying fineness and depositing the said grades of material in the ditch or trench with the finest grade on top in the form of a loose mulch.

4. A method of preparing soil for planting, consisting in disintegrating, shredding and removing a top layer or portion of soil, vegetation and other material, thereby forming a ditch, trench or furrow, separating the finer particles from the coarser particles and refuse and vegetable matter, depositing said coarser particles and refuse and vegetable matter on the bottom of said ditch, trench or furrow, compressing said deposited layer of matter, and depositing the finer particles of soil loosely on top of said compressed layer.

5. A method of preparing soil for planting, consisting in disintegrating, shredding and removing a top layer or portion of soil, vegetation and other material, thereby forming a ditch, trench or furrow, separating the finer particles from the coarser particles and refuse and vegetable matter, depositing said coarser particles and refuse and vegetable matter on the bottom of said ditch, trench or furrow, compressing said deposited layer of matter, separating the finer particles of soil into portions of various degrees of fineness, and loosely depositing said finer particles on top of said compressed layer with the finest particles on top so as to leave a loose mulch.

6. A method of preparing soil for planting, consisting in disintegrating, shredding and removing a top layer or portion of soil, vegetation and other material, thereby forming a ditch, trench or furrow, separating the finer particles from the coarser particles and refuse and vegetable matter, depositing said coarser particles and refuse and vegetable matter on the bottom of said ditch, trench or furrow, compressing said deposited layer of matter, and depositing the finer particles of soil loosely on top of said compressed layer, and then raking and compressing the top layer.

7. A method of preparing soil for planting, consisting in disintegrating, shredding and removing a top layer or portion of soil, vegetation and other material, thereby forming a ditch, trench or furrow, separating the finer particles from the coarser particles and refuse and vegetable matter, depositing said coarser particles and refuse and vegetable matter on the bottom of said ditch, trench or furrow, intermixing and tamping said coarser particles and refuse and vegetable matter and depositing the finer particles of soil on top of said layer of coarse material.

8. A method of preparing soil for planting consisting in removing a layer of the soil, vegetation and other material, disintegrating the same and separating the finer particles therefrom, removing a portion of the soil from the bottom of the ditch or trench formed by the removal of said layer of material, depositing the larger particle of soil, vegetation and other material in th bottom of the ditch or trench, and mixing and depositing said finer particles and said second portion of soil together on top of said redeposited larger particles.

JESSE S. WENTWORTH.